United States Patent
Thompson et al.

(10) Patent No.: US 9,136,943 B2
(45) Date of Patent: Sep. 15, 2015

(54) METHOD OF CHARACTERIZING IMPAIRMENTS DETECTED BY EQUALIZATION ON A CHANNEL OF A NETWORK

(75) Inventors: Robert J. Thompson, Monroeton, PA (US); Charles S. Moore, Langhorne, PA (US); John L. Moran, III, Millville, MA (US); Marc L. Morrissette, Plainville, MA (US)

(73) Assignee: ARRIS Technology, Inc., Suwanee, GA (US)

( * ) Notice: Subject to any disclaimer, the term of this patent is extended or adjusted under 35 U.S.C. 154(b) by 266 days.

(21) Appl. No.: 13/562,261

(22) Filed: Jul. 30, 2012

(65) Prior Publication Data

US 2014/0029655 A1    Jan. 30, 2014

(51) Int. Cl.
*H04B 10/079* (2013.01)
*H04B 10/66* (2013.01)
*H04B 3/46* (2015.01)
*H04B 10/2507* (2013.01)
(Continued)

(52) U.S. Cl.
CPC ............. *H04B 10/0795* (2013.01); *H04B 3/46* (2013.01); *H04B 10/2507* (2013.01); *H04B 10/25751* (2013.01); *H04B 10/66* (2013.01); *H04L 25/03006* (2013.01)

(58) Field of Classification Search
CPC ...... H04B 10/0793; H04B 10/66; H04B 3/46; H04B 10/0731; H04B 10/25
USPC ....................................................... 277/636
See application file for complete search history.

(56) References Cited

U.S. PATENT DOCUMENTS

| | | | |
|---|---|---|---|
| 3,838,221 | A | 9/1974 | Nosaka et al. |
| 4,245,342 | A | 1/1981 | Entenman |

(Continued)

FOREIGN PATENT DOCUMENTS

| | | |
|---|---|---|
| DE | 69631420 T2 | 12/2004 |
| EP | 1235402 A2 | 8/2002 |

(Continued)

OTHER PUBLICATIONS

Cable Television Laboratories, Inc., "A Simple Algorithm for Fault Localization Using Naming Convention and Micro-reflection Signature," Invention Disclosure 60193, 2 pages, Jun. 2008.

(Continued)

*Primary Examiner* — Chieh M Fan
*Assistant Examiner* — Sarah Hassan
(74) *Attorney, Agent, or Firm* — Stewart M. Wiener

(57) ABSTRACT

An automated method of characterizing distortion detected by equalization on a channel of a network is provided. Equalization stress of an observed channel equalization response of an end device of the network is estimated, and equalization stress is calculated for a theoretical channel equalization response of the end device mathematically based on the observed channel equalization response and a theoretical removal of a suspected impairment from the network. The above referenced calculating step is separately repeated for each of a plurality of suspected impairments stored in a database of suspected impairments. A highest ranking suspected dominant impairment is determined from the database of suspected impairments such that removal of the highest ranking suspected dominant impairment from the network would provide a greatest reduction of equalization stress of a channel equalization response of the end device.

16 Claims, 8 Drawing Sheets

(51) Int. Cl.
*H04B 10/2575* (2013.01)
*H04L 25/03* (2006.01)

(56) References Cited

U.S. PATENT DOCUMENTS

| | | |
|---|---|---|
| 4,385,392 A | 5/1983 | Angell et al. |
| 4,811,360 A | 3/1989 | Potter |
| 4,999,787 A | 3/1991 | McNally et al. |
| 5,228,060 A | 7/1993 | Uchiyama |
| 5,251,324 A | 10/1993 | McMullan et al. |
| 5,271,060 A | 12/1993 | Moran et al. |
| 5,278,977 A | 1/1994 | Spencer et al. |
| 5,347,539 A | 9/1994 | Sridhar et al. |
| 5,390,339 A | 2/1995 | Bruckert et al. |
| 5,463,661 A | 10/1995 | Moran et al. |
| 5,532,865 A | 7/1996 | Utsumi et al. |
| 5,557,603 A | 9/1996 | Barlett et al. |
| 5,606,725 A | 2/1997 | Hart |
| 5,631,846 A | 5/1997 | Szurkowski |
| 5,692,010 A | 11/1997 | Nielsen |
| 5,694,437 A | 12/1997 | Yang et al. |
| 5,732,104 A | 3/1998 | Brown et al. |
| 5,790,523 A | 8/1998 | Ritchie et al. |
| 5,862,451 A | 1/1999 | Grau et al. |
| 5,867,539 A | 2/1999 | Koslov |
| 5,870,429 A | 2/1999 | Moran et al. |
| 5,886,749 A | 3/1999 | Williams et al. |
| 5,939,887 A | 8/1999 | Schmidt et al. |
| 5,943,604 A | 8/1999 | Chen et al. |
| 6,032,019 A | 2/2000 | Chen et al. |
| 6,061,393 A | 5/2000 | Tsui et al. |
| 6,108,351 A | 8/2000 | Hardy et al. |
| 6,154,503 A | 11/2000 | Strolle et al. |
| 6,229,792 B1 | 5/2001 | Anderson et al. |
| 6,230,326 B1 | 5/2001 | Unger et al. |
| 6,233,274 B1 | 5/2001 | Tsui et al. |
| 6,240,553 B1 | 5/2001 | Son et al. |
| 6,272,150 B1 | 8/2001 | Hrastar et al. |
| 6,278,730 B1 | 8/2001 | Tsui et al. |
| 6,308,286 B1 | 10/2001 | Richmond et al. |
| 6,310,909 B1 | 10/2001 | Jones |
| 6,321,384 B1 | 11/2001 | Eldering |
| 6,330,221 B1 | 12/2001 | Gomez |
| 6,334,219 B1 | 12/2001 | Hill et al. |
| 6,377,552 B1 | 4/2002 | Moran, III et al. |
| 6,385,773 B1 | 5/2002 | Schwartzman et al. |
| 6,389,068 B1 | 5/2002 | Smith et al. |
| 6,434,084 B1 * | 8/2002 | Schultz ............... 367/81 |
| 6,434,583 B1 | 8/2002 | Dapper et al. |
| 6,445,734 B1 | 9/2002 | Chen et al. |
| 6,456,597 B1 | 9/2002 | Bare |
| 6,459,703 B1 | 10/2002 | Grimwood et al. |
| 6,477,197 B1 | 11/2002 | Unger |
| 6,480,469 B1 | 11/2002 | Moore et al. |
| 6,483,033 B1 | 11/2002 | Simoes et al. |
| 6,498,663 B1 | 12/2002 | Farhan et al. |
| 6,512,616 B1 | 1/2003 | Nishihara |
| 6,526,260 B1 | 2/2003 | Hick et al. |
| 6,546,557 B1 | 4/2003 | Ovadia |
| 6,556,239 B1 | 4/2003 | Al-Araji et al. |
| 6,556,562 B1 | 4/2003 | Bhagavath et al. |
| 6,556,660 B1 | 4/2003 | Li et al. |
| 6,559,756 B2 | 5/2003 | Al-Araji et al. |
| 6,563,868 B1 | 5/2003 | Zhang et al. |
| 6,570,394 B1 | 5/2003 | Williams |
| 6,570,913 B1 | 5/2003 | Chen |
| 6,574,797 B1 | 6/2003 | Naegeli et al. |
| 6,588,016 B1 | 7/2003 | Chen et al. |
| 6,606,351 B1 | 8/2003 | Dapper et al. |
| 6,611,795 B2 | 8/2003 | Cooper |
| 6,646,677 B2 | 11/2003 | Noro et al. |
| 6,662,135 B1 | 12/2003 | Burns et al. |
| 6,662,368 B1 | 12/2003 | Cloonan et al. |
| 6,671,334 B1 | 12/2003 | Kuntz et al. |
| 6,687,632 B1 | 2/2004 | Rittman |
| 6,690,655 B1 | 2/2004 | Miner et al. |
| 6,700,875 B1 | 3/2004 | Schroeder et al. |
| 6,700,927 B1 | 3/2004 | Esliger et al. |
| 6,711,134 B1 | 3/2004 | Wichelman et al. |
| 6,741,947 B1 | 5/2004 | Wichelman et al. |
| 6,748,551 B2 | 6/2004 | Furudate et al. |
| 6,757,253 B1 | 6/2004 | Cooper et al. |
| 6,772,388 B2 | 8/2004 | Cooper et al. |
| 6,772,437 B1 | 8/2004 | Cooper et al. |
| 6,775,840 B1 | 8/2004 | Naegel et al. |
| 6,816,463 B2 | 11/2004 | Cooper et al. |
| 6,839,829 B1 | 1/2005 | Daruwalla et al. |
| 6,853,932 B1 | 2/2005 | Wichelman et al. |
| 6,877,166 B1 | 4/2005 | Roeck et al. |
| 6,895,043 B1 | 5/2005 | Naegeli et al. |
| 6,895,594 B1 | 5/2005 | Simoes et al. |
| 6,906,526 B2 | 6/2005 | Hart, Jr. et al. |
| 6,928,475 B2 | 8/2005 | Schenkel et al. |
| 6,944,881 B1 | 9/2005 | Vogel |
| 6,961,314 B1 | 11/2005 | Quigley et al. |
| 6,961,370 B2 | 11/2005 | Chappell |
| 6,967,994 B2 | 11/2005 | Boer et al. |
| 6,973,141 B1 | 12/2005 | Isaksen et al. |
| 6,978,015 B1 | 12/2005 | Erickson et al. |
| 6,985,437 B1 | 1/2006 | Vogel |
| 6,999,408 B1 | 2/2006 | Gomez |
| 7,002,899 B2 | 2/2006 | Azenkot et al. |
| 7,010,002 B2 | 3/2006 | Chow et al. |
| 7,017,176 B1 | 3/2006 | Lee et al. |
| 7,032,159 B2 | 4/2006 | Lusky et al. |
| 7,039,939 B1 | 5/2006 | Millet et al. |
| 7,050,419 B2 | 5/2006 | Azenkot et al. |
| 7,054,554 B1 | 5/2006 | McNamara et al. |
| 7,058,007 B1 | 6/2006 | Daruwalla et al. |
| 7,072,365 B1 | 7/2006 | Ansley |
| 7,079,457 B2 | 7/2006 | Wakabayashi et al. |
| 7,099,412 B2 | 8/2006 | Coffey |
| 7,099,580 B1 | 8/2006 | Bulbul |
| 7,139,283 B2 | 11/2006 | Quigley et al. |
| 7,142,609 B2 | 11/2006 | Terreault et al. |
| 7,152,025 B2 | 12/2006 | Lusky et al. |
| 7,158,542 B1 | 1/2007 | Zeng et al. |
| 7,164,694 B1 | 1/2007 | Nodoushani et al. |
| 7,177,324 B1 | 2/2007 | Choudhury et al. |
| 7,197,067 B2 | 3/2007 | Lusky et al. |
| 7,222,255 B1 | 5/2007 | Claessens et al. |
| 7,227,863 B1 | 6/2007 | Leung et al. |
| 7,242,862 B2 | 7/2007 | Saunders et al. |
| 7,246,368 B1 | 7/2007 | Millet et al. |
| 7,263,123 B2 | 8/2007 | Yousef |
| 7,274,735 B2 | 9/2007 | Lusky et al. |
| 7,295,518 B1 | 11/2007 | Monk et al. |
| 7,315,573 B2 | 1/2008 | Lusky et al. |
| 7,315,967 B2 | 1/2008 | Azenko et al. |
| 7,400,677 B2 | 7/2008 | Jones |
| 7,421,276 B2 | 9/2008 | Steer et al. |
| 7,451,472 B2 | 11/2008 | Williams |
| 7,492,703 B2 | 2/2009 | Lusky et al. |
| 7,554,902 B2 | 6/2009 | Kim et al. |
| 7,573,884 B2 | 8/2009 | Klimker et al. |
| 7,573,935 B2 | 8/2009 | Min et al. |
| 7,584,298 B2 | 9/2009 | Klinker et al. |
| 7,616,654 B2 | 11/2009 | Moran, III et al. |
| 7,650,112 B2 | 1/2010 | Utsumi et al. |
| 7,672,310 B2 | 3/2010 | Cooper et al. |
| 7,684,315 B1 | 3/2010 | Beser |
| 7,684,341 B2 | 3/2010 | Howald |
| 7,693,090 B1 | 4/2010 | Kimpe |
| 7,716,712 B2 | 5/2010 | Booth et al. |
| 7,739,359 B1 | 6/2010 | Millet et al. |
| 7,742,697 B2 | 6/2010 | Cooper et al. |
| 7,742,771 B2 | 6/2010 | Thibeault |
| 7,760,624 B1 | 7/2010 | Goodson et al. |
| 7,778,314 B2 | 8/2010 | Wajcer et al. |
| 7,787,557 B2 | 8/2010 | Kim et al. |
| 7,792,183 B2 | 9/2010 | Massey et al. |
| 7,826,569 B2 * | 11/2010 | Popper et al. ............... 375/346 |
| 7,856,049 B2 | 12/2010 | Currivan et al. |
| 7,876,697 B2 | 1/2011 | Thompson et al. |

(56) References Cited

U.S. PATENT DOCUMENTS

| | | |
|---|---|---|
| 7,953,144 B2 | 5/2011 | Allen et al. |
| 7,970,010 B2 | 6/2011 | Denney et al. |
| 8,000,254 B2 | 8/2011 | Thompson et al. |
| 8,037,541 B2 | 10/2011 | Montague et al. |
| 8,040,915 B2 | 10/2011 | Cummings |
| 8,059,546 B2 | 11/2011 | Pai et al. |
| 8,081,674 B2 | 12/2011 | Thompson et al. |
| 8,116,360 B2 | 2/2012 | Thibeault |
| 8,265,559 B2 | 9/2012 | Cooper et al. |
| 8,284,828 B2 | 10/2012 | Cooper et al. |
| 8,345,557 B2 | 1/2013 | Thibeault et al. |
| 2001/0055319 A1 | 12/2001 | Quigley et al. |
| 2002/0038461 A1 | 3/2002 | White |
| 2002/0044531 A1 | 4/2002 | Cooper et al. |
| 2002/0091970 A1 | 7/2002 | Furudate et al. |
| 2002/0116493 A1 | 8/2002 | Schenkel et al. |
| 2002/0154620 A1 | 10/2002 | Azenkot et al. |
| 2002/0168131 A1 | 11/2002 | Walter et al. |
| 2002/0172447 A1* | 11/2002 | MacDonald et al. ......... 385/13 |
| 2002/0181395 A1 | 12/2002 | Foster et al. |
| 2003/0028898 A1 | 2/2003 | Howald |
| 2003/0043732 A1 | 3/2003 | Walton et al. |
| 2003/0067883 A1 | 4/2003 | Azenkot et al. |
| 2003/0101463 A1 | 5/2003 | Greene et al. |
| 2003/0108052 A1 | 6/2003 | Inoue et al. |
| 2003/0120819 A1 | 6/2003 | Abramson |
| 2003/0138250 A1 | 7/2003 | Glynn |
| 2003/0141941 A1* | 7/2003 | Ozawa et al. ............... 333/28 R |
| 2003/0149991 A1 | 8/2003 | Reidhead et al. |
| 2003/0158940 A1 | 8/2003 | Leigh |
| 2003/0179768 A1 | 9/2003 | Lusky et al. |
| 2003/0179770 A1 | 9/2003 | Reznic et al. |
| 2003/0179821 A1 | 9/2003 | Lusky et al. |
| 2003/0181185 A1 | 9/2003 | Lusky et al. |
| 2003/0182664 A1 | 9/2003 | Lusky et al. |
| 2003/0185176 A1 | 10/2003 | Lusky et al. |
| 2003/0188254 A1 | 10/2003 | Lusky et al. |
| 2003/0200317 A1 | 10/2003 | Zeitak et al. |
| 2003/0212999 A1 | 11/2003 | Cai |
| 2003/0223507 A1* | 12/2003 | De Gaudenzi et al. ....... 375/279 |
| 2004/0015765 A1 | 1/2004 | Cooper et al. |
| 2004/0042385 A1 | 3/2004 | Kim et al. |
| 2004/0047284 A1 | 3/2004 | Eidson |
| 2004/0052356 A1 | 3/2004 | McKinzie et al. |
| 2004/0062548 A1 | 4/2004 | Obeda et al. |
| 2004/0073937 A1 | 4/2004 | Williams |
| 2004/0109661 A1 | 6/2004 | Bierman et al. |
| 2004/0114936 A1* | 6/2004 | Sugihara et al. ............. 398/147 |
| 2004/0139473 A1 | 7/2004 | Greene |
| 2004/0163129 A1 | 8/2004 | Chapman et al. |
| 2004/0181811 A1 | 9/2004 | Rakib |
| 2004/0208513 A1 | 10/2004 | Peddanarappagari et al. |
| 2004/0233234 A1 | 11/2004 | Chaudhry et al. |
| 2004/0233926 A1 | 11/2004 | Cummings |
| 2004/0248520 A1 | 12/2004 | Miyoshi |
| 2004/0261119 A1 | 12/2004 | Williams |
| 2005/0010958 A1 | 1/2005 | Rakib et al. |
| 2005/0025145 A1 | 2/2005 | Rakib et al. |
| 2005/0034159 A1 | 2/2005 | Ophir et al. |
| 2005/0039103 A1 | 2/2005 | Azenko et al. |
| 2005/0058082 A1 | 3/2005 | Moran et al. |
| 2005/0064890 A1 | 3/2005 | Johan et al. |
| 2005/0094957 A1* | 5/2005 | Takahashi .................... 385/129 |
| 2005/0097617 A1 | 5/2005 | Currivan et al. |
| 2005/0108763 A1 | 5/2005 | Baran et al. |
| 2005/0122996 A1 | 6/2005 | Azenkot et al. |
| 2005/0163088 A1 | 7/2005 | Yamano et al. |
| 2005/0175080 A1 | 8/2005 | Bouillett |
| 2005/0183130 A1 | 8/2005 | Sadja et al. |
| 2005/0198688 A1 | 9/2005 | Fong |
| 2005/0226161 A1 | 10/2005 | Jaworski |
| 2005/0281200 A1 | 12/2005 | Terreault |
| 2006/0013147 A1 | 1/2006 | Terpstra |
| 2006/0121946 A1 | 6/2006 | Walton et al. |
| 2006/0250967 A1 | 11/2006 | Miller et al. |
| 2006/0262722 A1 | 11/2006 | Chapman et al. |
| 2007/0002752 A1 | 1/2007 | Thibeault et al. |
| 2007/0058542 A1 | 3/2007 | Thibeault |
| 2007/0076592 A1 | 4/2007 | Thibeault |
| 2007/0076789 A1 | 4/2007 | Thibeault |
| 2007/0076790 A1 | 4/2007 | Thibeault et al. |
| 2007/0086328 A1 | 4/2007 | Kao et al. |
| 2007/0094691 A1 | 4/2007 | Gazdzinski |
| 2007/0097907 A1 | 5/2007 | Cummings |
| 2007/0121712 A1* | 5/2007 | Okamoto ...................... 375/222 |
| 2007/0133672 A1 | 6/2007 | Lee et al. |
| 2007/0143654 A1 | 6/2007 | Joyce et al. |
| 2007/0147489 A1 | 6/2007 | Sun |
| 2007/0177526 A1 | 8/2007 | Siripunkaw et al. |
| 2007/0184835 A1 | 8/2007 | Bitran et al. |
| 2007/0189770 A1 | 8/2007 | Sucharczuk et al. |
| 2007/0201547 A1* | 8/2007 | Willcocks et al. ............ 375/233 |
| 2007/0206600 A1 | 9/2007 | Klimker et al. |
| 2007/0206625 A1 | 9/2007 | Maeda |
| 2007/0211618 A1 | 9/2007 | Cooper et al. |
| 2007/0223512 A1 | 9/2007 | Cooper et al. |
| 2007/0223920 A1 | 9/2007 | Moore et al. |
| 2007/0245177 A1 | 10/2007 | Cooper et al. |
| 2007/0268963 A1* | 11/2007 | Wallace et al. ............... 375/226 |
| 2008/0056713 A1 | 3/2008 | Cooper et al. |
| 2008/0062888 A1 | 3/2008 | Lusky et al. |
| 2008/0075157 A1 | 3/2008 | Allen et al. |
| 2008/0101210 A1 | 5/2008 | Thompson et al. |
| 2008/0125984 A1 | 5/2008 | Skendzic et al. |
| 2008/0140823 A1 | 6/2008 | Thompson et al. |
| 2008/0193137 A1 | 8/2008 | Thompson et al. |
| 2008/0200129 A1 | 8/2008 | Cooper et al. |
| 2008/0242339 A1 | 10/2008 | Anderson |
| 2008/0250508 A1 | 10/2008 | Montague et al. |
| 2008/0274700 A1 | 11/2008 | Li |
| 2008/0291840 A1 | 11/2008 | Cooper et al. |
| 2009/0031384 A1 | 1/2009 | Brooks et al. |
| 2009/0103557 A1 | 4/2009 | Hong et al. |
| 2009/0103669 A1 | 4/2009 | Kolze et al. |
| 2009/0109877 A1 | 4/2009 | Murray et al. |
| 2009/0249421 A1 | 10/2009 | Liu et al. |
| 2009/0252234 A1 | 10/2009 | Samdani et al. |
| 2010/0083356 A1 | 4/2010 | Steckley et al. |
| 2010/0095360 A1 | 4/2010 | Pavlovski et al. |
| 2010/0154017 A1 | 6/2010 | An et al. |
| 2010/0157824 A1 | 6/2010 | Thompson et al. |
| 2010/0158093 A1 | 6/2010 | Thompson et al. |
| 2010/0185391 A1 | 7/2010 | Lee et al. |
| 2010/0223650 A1 | 9/2010 | Millet et al. |
| 2010/0251320 A1 | 9/2010 | Shafer et al. |
| 2011/0026577 A1 | 2/2011 | Primo et al. |
| 2011/0030019 A1 | 2/2011 | Ulm et al. |
| 2011/0069745 A1 | 3/2011 | Thompson et al. |
| 2011/0072127 A1 | 3/2011 | Gerber et al. |
| 2011/0103790 A1 | 5/2011 | Palacharla et al. |
| 2011/0110415 A1 | 5/2011 | Cooper et al. |
| 2011/0153683 A1 | 6/2011 | Hoskinson |
| 2011/0194418 A1 | 8/2011 | Wolcott et al. |
| 2011/0194597 A1 | 8/2011 | Wolcott et al. |
| 2011/0197071 A1 | 8/2011 | Wolcott et al. |
| 2011/0243214 A1 | 10/2011 | Wolcott et al. |
| 2012/0054312 A1 | 3/2012 | Salinger |
| 2012/0084416 A1 | 4/2012 | Thibeault et al. |
| 2012/0147751 A1 | 6/2012 | Ulm |
| 2013/0041990 A1 | 2/2013 | Thibeault et al. |
| 2013/0051442 A1 | 2/2013 | Cooper et al. |
| 2013/0128723 A1 | 5/2013 | Thibeault et al. |
| 2013/0148707 A1 | 6/2013 | Thibeault et al. |
| 2013/0286852 A1 | 10/2013 | Bowler et al. |
| 2013/0290783 A1 | 10/2013 | Bowler et al. |
| 2013/0290791 A1 | 10/2013 | Basile et al. |
| 2013/0291034 A1 | 10/2013 | Basile et al. |
| 2013/0294489 A1 | 11/2013 | Thibeault et al. |
| 2014/0029654 A1 | 1/2014 | Thompson et al. |
| 2014/0029655 A1 | 1/2014 | Thompson et al. |
| 2014/0133533 A1 | 5/2014 | Thibeault et al. |

(56) References Cited

U.S. PATENT DOCUMENTS

FOREIGN PATENT DOCUMENTS

| | | |
|---|---|---|
| EP | 1341335 A2 | 9/2003 |
| JP | 55132161 A | 10/1980 |
| JP | 04208707 A | 7/1992 |
| JP | 6120896 A | 4/1994 |
| JP | 6177840 A | 6/1994 |
| JP | 09008738 A | 1/1997 |
| JP | 9162816 A | 6/1997 |
| JP | 10247893 A | 9/1998 |
| JP | 11230857 A | 8/1999 |
| JP | 2001044956 A | 2/2001 |
| JP | 2003530761 A | 10/2003 |
| JP | 2004172783 A | 6/2004 |
| JP | 2004343678 A | 12/2004 |
| WO | 0192901 A1 | 6/2001 |
| WO | 0233974 A1 | 4/2002 |
| WO | 2004062124 A1 | 7/2004 |
| WO | 2009146426 A1 | 12/2009 |

OTHER PUBLICATIONS

Cable Television Laboratories, Inc., "Data-Over-Cable Service Interface Specifications DOCSIS 3.0: MAC and Upper Layer Protocols Interface," CM-SP-MULPIv3.0-116-110623, section 8, pp. 242-266, Jun. 2011.
Cable Television Laboratories, Inc., "Data-Over-Cable Service Interface Specifications DOCSIS® 3.0—Mac and Upper Layer Protocols Interface Specification," CM-SP-MULPIv3.0-117-111117, Nov. 2011.
Cable Television Laboratories, Inc., "DOCSIS Best Practices and Guidelines: Proactive Network Maintenance Using Pre-Equalization," CM-GL-PNMP-V01-100415, Apr. 2010.
Cable Television Laboratories, Inc., "Pre-Equalization Based Pro-active Network Maintenance Process Model for CMs Transmitting on Multiple Upstream Channels," Invention Disclosure 60203, 2 pages, May 2009.
Cable Television Laboratories, Inc., "Pre-Equalization based pro-active network maintenance process model", Invention Disclosure 60177, 2 pages, Jun. 2008.
Cable Television Laboratories, Inc., "DOCSIS® Best Practices and Guidelines: Proactive Network Maintenance Using Pre-equalization," CM-GL-PNMP-V02-110623, Jun. 2011.
Cable Television Laboratories, Inc., "Data-Over-Cable Service Interface Specifications: DOCSIS 2.0 Radio Frequency Interface Specification," CM-SP-RFIv2.0-106-040804, Apr. 2004.
L.A. Campos, et al., "Pre-equalization based Pro-active Network Maintenance Methodology", Cable Television Laboratories, Inc., presentation, 32 pages, 2008.
R.L. Howald, et al., "Customized Broadband—Analysis Techniques for Blended Multiplexes," NCTA Technical Papers, 2002.
R. Howald, "Access Networks Solutions: Introduction to S-CDMA," Presentation to Society of Cable Telecommunications Engineers (SCTE) South Florida Chapter, 2009.
R. Howald, "Upstream Snapshots & Indicators (2009)," Regional Samples, Presentation to Society of Cable Telecommunications Engineers (SCTE) South Florida Chapter, Jan. 2010.
R.L. Howald et al., "Characterizing and Aligning the HFC Return Path for Successful DOCSIS 3.0 Rollouts", SCTE Cable-Tec Expo, Oct. 2009.
R. Howald, et al., "DOCSIS 3.0 Upstream: Readiness & Qualification," SCTE Cable-Tec Expo, Oct. 2009.
R. Howald, et al., "The Grown-Up Potential of a Teenage PHY", NCTA Convention and Exposition, May 2012.
R. Howald, "DOCSIS 3.0 Upstream: Technology, RF Variables & Case Studies," Access Networks Solutions, 2009, presentation to Society of Cable Telecommunications Engineers (SCTE) South Floriday Chapter, 23 pages, Jan. 2010.
R. Hranac, "Linear Distortions, Part 1," Communication Technology, Jul. 2005.
X. Liu, et al., "Variable Bit Rate Video Services in DOCSIS 3.0 Networks," NCTA Technical Papers, 2008.
Y. Morishita, et al., "An LMS adaptive equalizer using threshold in impulse noise environments", IEEE, ICT 2003 10th International Conference on Telecommunications, vol. 1, pp. 578-582, Feb. 2003.
Motorola, Inc., "White Paper: Expanding Bandwidth Using Advanced Spectrum Management," Sep. 25, 2003.
H. Newton, Newton's Telecom Dictionary, Flatiron Publishing, 9th ed., pp. 216 and 1023 (definitions of "carrier to noise ratio" and "signal to noise ratio"), Sep. 1995.
M. Patrick, et al., "Delivering Economical IP Video over DOCSIS by Bypassing the M-CMTS with DIBA," SCTE 2007 Emerging Technologies, NCTA Technical Papers, 2007.
A. Popper, et al., "An Advanced Receiver with Interference Cancellation for Broadband Cable Networks," 2002 International Zurich Seminar on Broadband Communications—Access, Transmission, Networking, pp. 23-1-23-6, IEEE, 2002.
A. Popper, et al, "Ingress Noise Cancellation for the Upstream Channel in Broadband Cable Access Systems," 2002 IEEE International Conference on Communications, vol. 3, pp. 1808-1812. IEEE, 2002.
S.U.H. Qureshi, "Adaptive Equalization," Proceedings of the IEEE, vol. 73, No. 9, pp. 1349-1387, Sep. 1985.
S. Ramakrishnan, "Scaling the DOCSIS Network for IPTV," SCTE Conference on Emerging Technologies, NCTA Cable Show, Apr. 2009.
Y. R. Shelke, "Knowledge Based Topology Discovery and Geo-localization", Thesis, Master of Science, Ohio State University, 2010.
R. Thompson, et al., "256-QAM for Upstream HFC," NCTA 2010 Spring Technical Forum Proceedings, pp. 142-152, May 2010.
R. Thompson, et al., "256-QAM for Upstream HFC Part Two", SCTE Cable-Tec Expo 2011, Technical Paper, Nov. 2011.
R. Thompson, et al., "Multiple Access Made Easy," SCTE Cable-Tec Expo 2011, Technical Paper, Nov. 2011.
R. Thompson, et al., "Optimizing Upstream Throughput Using Equalization Coefficient Analysis", National Cable & Telecommunications Association (NCTA) Technical Papers, Apr. 2009.
R. Thompson, et al., "Practical Considerations for Migrating the Network Toward All-Digital", Society of Cable Telecommunications Engineers (SCTE) Cable-Tec Expo, Oct. 2009.
R. Thompson, et al., "64-QAM, 6.4MHz Upstream Deployment Challenges," SCTE Canadian Summit, Toronto, Canada, Technical Paper, Mar. 2011.
B. Volpe, et al., "Cable-Tec Expo 2011: Advanced Troubleshooting in a DOCSIS© 3.0 Plant," Nov. 2011.
L. Wolcott, "Modem Signal Usage and Fault Isolation," U.S. Appl. No. 61/301,835, filed Feb. 5, 2010.
F. Zhao, et al., "Techniques for minimizing error propagation in decision feedback detectors for recording channels," IEEE Transactions on Magnetics, Vol. 37, No. 1, pp. 592-602, Jan. 2001.
PCT International Preliminary Report on Patentability and Written Opinion, Re: Application No. PCT/US2013/052757, dated Feb. 3, 2015.

* cited by examiner

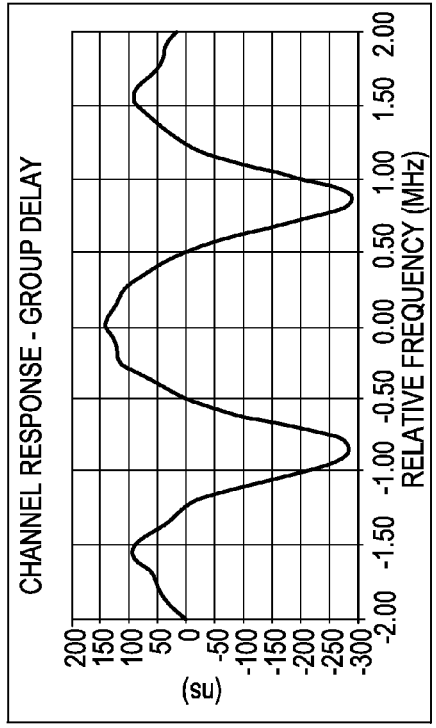
FIG. 5A
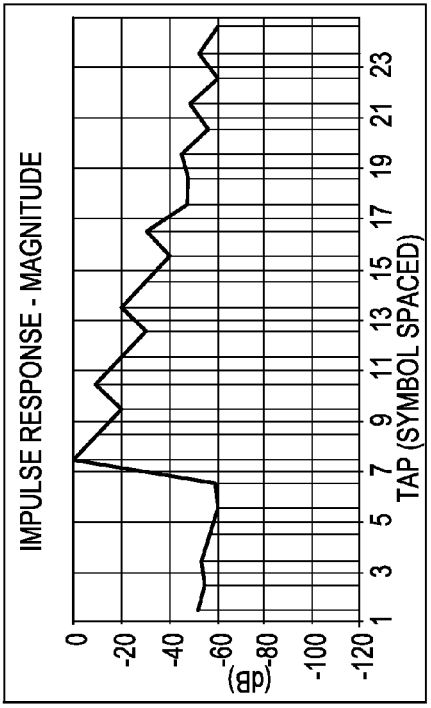
FIG. 5B
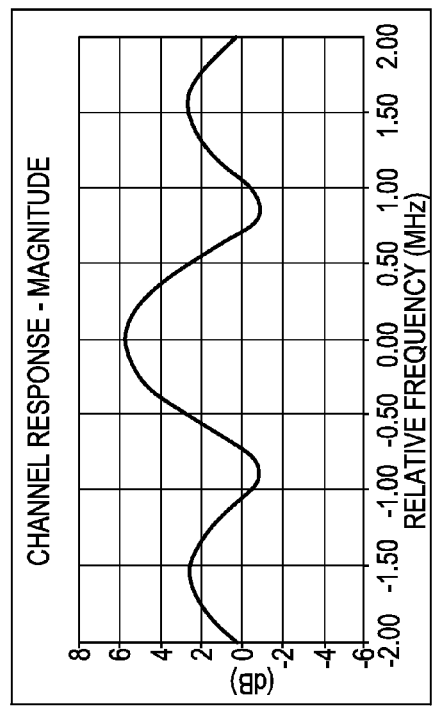
FIG. 5C
PNM METRICS
PREMTE       2.364E-05
POSTMTE      2.097E-01
MTE          8.105E-01
TTE          1.020E+00
MTC              1.000
NMTTER          -6.870
PREMTTER       -46.350
POSTMTTER       -6.871
PPESR          -39.479
PPTSR           19.994
FIG. 5D

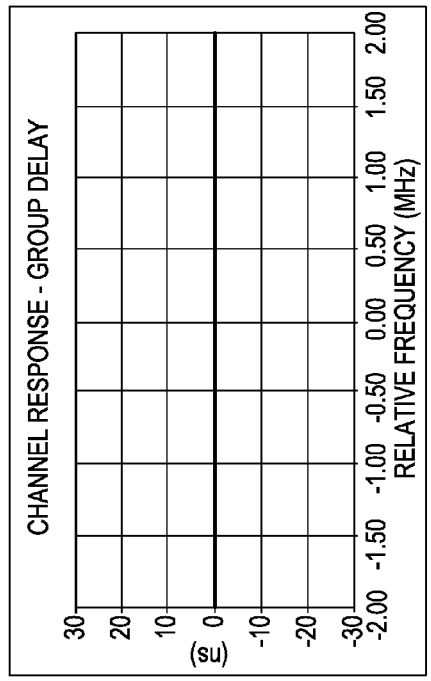
FIG. 8A
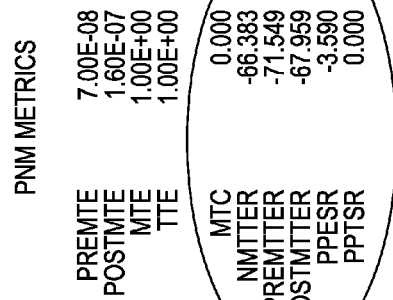
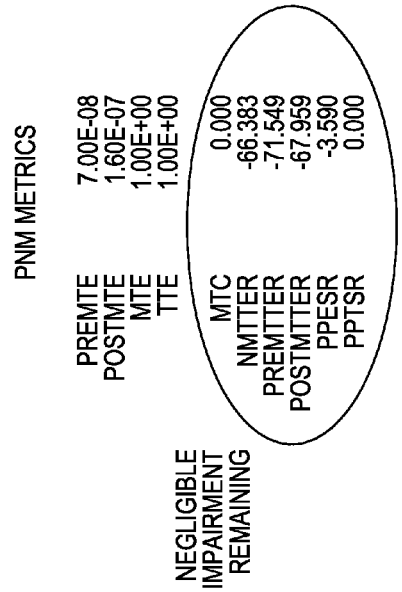
FIG. 8C
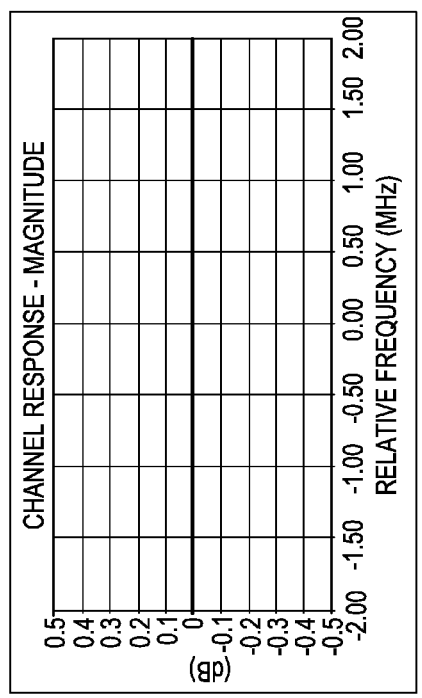
FIG. 8B
FIG. 8D

METHOD OF CHARACTERIZING IMPAIRMENTS DETECTED BY EQUALIZATION ON A CHANNEL OF A NETWORK

BACKGROUND

The digital communications receiver function of equalization is part of many modern telecommunications platforms. For instance, equalization is instrumental in proper return operation in Data Over Cable System Interface Specification (DOCSIS) systems. The term DOCSIS refers to a group of specifications that define industry standards for cable headend and cable modem equipment. In a DOCSIS network, upstream channel impairments can be mitigated by equalization.

During equalization, an equalizer generates coefficient information that is used to create an equalizing filter, with an inverse channel response, canceling distortion in the channel caused by upstream channel impairments. The equalization coefficients of DOCSIS can be 24 symbol-spaced coefficients (also referred to as taps).

Analysis of the equalization coefficients used to create the equalizing filter may be used to diagnose network issues. For instance, many cable operators participate in CableLabs' Proactive Network Maintenance (PNM) committee and are evaluating integration of this type of technology into their existing diagnostic systems because it is believed that equalization coefficient analysis may improve diagnostic efficiency.

A "proactive" aspect of equalization coefficient analysis comes from the ability to identify network problems before traditional metrics, including Modulation Error Ratio (MER), Transmit Power, Receive Power, Forward Error Correction (FEC), and Codeword Error Rate (CER).

However, statistical methods of interpretation used for equalization coefficient analysis are not without problems. For instance, when multiple upstream impairments are present, impairment characteristics are almost always misdiagnosed because the current process used for equalization coefficient analysis is limited to statistical analysis of frequency domain characteristics of an impaired equalization response. Thus, problems with the analysis are greatly exacerbated when multiple impairments are being experienced thereby reducing diagnostic capability.

BRIEF DESCRIPTION OF THE DRAWINGS

Various features of the embodiments described in the following detailed description can be more fully appreciated when considered with reference to the accompanying figures, wherein the same numbers refer to the same elements.

FIGS. 5A-5D illustrate a composite impairment response to a composite micro-reflection scenario according to an embodiment.

FIGS. 8A-8D illustrate the results when a second dominant micro-reflection properly diagnosed is removed from the composite impairment response of FIG. 5 according to an embodiment.

DETAILED DESCRIPTION

Figure 1:
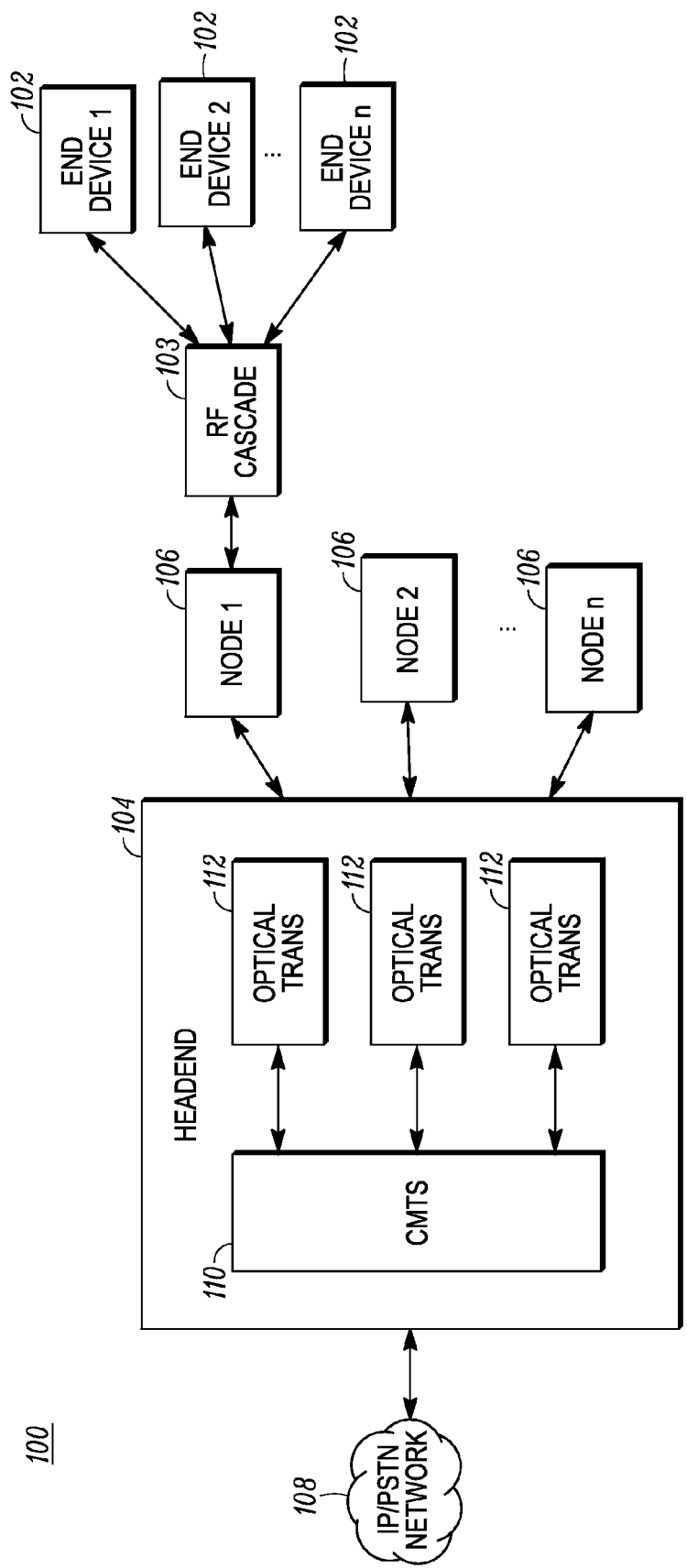
FIG. 1 illustrates a block diagram of a cable network according to an embodiment.

For simplicity and illustrative purposes, the principles of embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

Various program providers, such as multiple system operators, television networks and stations, cable TV operators, satellite TV operators, studios, wireless service providers, and Internet broadcasters/service providers, among others, operate broadband communication systems to deliver programming and like content to consumers or subscribers over networks via digital or analog signals. Networks such as hybrid fiber-coaxial (HFC) and fiber networks and physical plants can be extensive and complex and are typically difficult for an operator to manage and monitor for faults, impairments, and like issues.

A cable network, for instance, may include a headend which is connected to several nodes that may provide access to IP or ISPN networks. The headend typically interfaces with a cable modem termination system (CMTS) which has several receivers with each receiver connecting to numerous nodes each of which connect to numerous terminal network elements, such as modems, MTA (media terminal adaptors), set top boxes, terminal devices, customer premises equipment (CPE) or like devices of subscribers. By way of example, a single receiver of the CMTS may connect to several hundred or more terminal network elements, such as cable modems, and each cable modem may support data connection to the Internet and other computer networks via the cable network. In this regard, the cable network provides a bi-directional communication system in which data is sent downstream from the headend to a subscriber modem typically on different frequency bands and upstream from a subscriber modem to the headend typically on a dedicated frequency band, referred to as a return band.

Cable networks may carry signals which require a high quality and reliability of service, such as Voice over IP (VoIP) communications. Any disruption of voice or data traffic can be an inconvenience and often unacceptable to a customer.

A factor that affects the quality of upstream communications is the presence of up-stream channel distortion impairments, for instance, micro-reflections (MRs) of communication signals, group delay variation (GDV), and amplitude distortion (AD). The term "micro-reflection (MR)" refers to an impairment contribution wherein a copy of a communication signal is reflected back onto itself with a time delay. Significant MRs can degrade upstream HFC plant performance. The term "group delay variation (GDV)" refers to an impairment contribution wherein different frequency components of a signal propagate through a network component with different time delays. AD is an undesirable variation in an amplitude response of a channel, and common forms of AD include tilt, ripple, and roll-off.

A common cause of AD is upper return band-edge carriers aggravated by long reaches of a cable network plant. The long reaches accumulate diplex filters from devices including amplifiers and in-line equalizers. While individually contributing small attenuation versus frequency, the accumulated diplex filters can create appreciable response variation. In a quadrature amplitude modulation (QAM) constellation, amplitude roll-off causes the symbols to spread in a pattern similar in appearance to Additive White Gaussian Noise (AWGN) and causes received symbols to cross decision boundaries, resulting in errors.

GDV is an undesirable variation in the phase response of a communication channel and can result in distortion of the digital signal phase or a variation in the propagation of frequency components of the signal across the channel. As is the case for AD, a major cause of GDV in the plant is upper-band-edge operation combined with long reaches of cable network plant. Filtering functions typically induce nonlinear phase responses as the band edges are approached, so the combination of AD and GDV in the same band region can be expected with the understanding that diplex filtering is typically the cause. Different filter functions induce different GDV responses in a similar manner that different filter functions induce different stop-band characteristics. It is typical that the sharper the roll-off, such as would be the case for long cascades, the worse the GDV becomes. In a QAM constellation, GDV causes the symbols to spread in a pattern similar to AWGN and AD and causes received symbols to cross decision boundaries, resulting in errors. 64-QAM is more sensitive to GDV than 16-QAM because of relatively reduced decision boundary size of 64-QAM.

A MR, as seen by a receiver, is a copy of the transmitted signal arriving late with reduced amplitude. The result of the additional copy is typically seen by end users as image ghosting in analog video reception; whereas, for digital communications, the result is inter-symbol interference (ISI). MR sources are composed of pairs of hybrid fiber-coaxial (HFC) components separated by a distance of cable. The HFC components, also referred to as cable network components, facilitate the propagation of signal copies in a variety of ways including return loss, isolation, mixing, and combining. For instance, the MR may arise if a length of cable separates two devices with poor return loss, acting as signal reflectors. The reflector return loss and the loss between the reflectors determine the amplitude of the MR. Any HFC component, for instance a cable modem (CM), has the potential to act as a signal reflector. A CM typically has as a design limit of 6 dB return loss, meaning it may reflect up to 25% of its incident power. In the cable network plant, components other than the CM typically reflect a lower percentage of incident power because the design limits are typically significantly better. However, as the cable network plant ages and elements that contribute to good RF matching degrade, for instance connectors, cable, splitters, and interfaces on printed circuit boards (PCBs), the reflected percentage of incident power increases.

For purposes of offering higher data rates to subscribers in the industry of high-speed data and Internet access, operators typically desire to take advantage of throughput benefits gained from leveraging more complex digital modulation schemes, such as 32-QAM and 64-QAM. For a symbol rate of 5.12 Msps, 32-QAM allows approximately 20 Mbps 16-QAM upstream channel to become a 25 Mbps upstream channel, and 64-QAM allows a 16-QAM 20 Mbps upstream channel to become a 30 Mbps upstream channel. This can represent a 25-50% throughput improvement. However, channels using these higher digital modulation schemes are also considerably more sensitive to digital communication channel impairments such as the upstream impairments described above.

Given the potential problems that can be caused by upstream impairments, upstream channels can be difficult to manage and fully exploit. Operators prefer to ensure that capacity associated with the upstream channel, or as much of the capacity as possible, is realized for services and revenue. Accurately diagnosing upstream issues has typically required technicians or engineers to be at multiple locations within a HFC plant and simultaneously inject test signals at the suspected device locations. This diagnostic process requires extensive manual effort, often requiring rolling trucks to remote locations within a plant or specialized test equipment. This diagnostic process is time consuming and costly.

A more comprehensive approach that improves reliability of impairment identification is needed so that suspect HFC components can be efficiently identified for maintenance. The approach should maximize the chance that a truck roll to eradicate a problem is successful and is not simply a first-to-try-of-many type of approach. The time spent by operators on trouble-shooting physical plant problems with technician time and truck rolls should be minimized.

According to an embodiment, equalization coefficients that are used by an equalizer to mitigate distortion in upstream channels for an end device are analyzed. The equalization coefficients define a channel equalization response to impairments on the network to which the end device is subject. The channel equalization response is analyzed to determine whether impairment problems exist in the upstream channel, to characterize impairments detected by equalization, and to identify the type or types of impairment problems that may exist. The analysis is able to properly decompose a multi- or composite impairment response into its contributing impairments so that each dominant impairment of the composite can be properly identified. The identification of impairments and potential solutions can be determined in an automated manner before a customer problem is experienced and without dispatching technicians to diagnose the problem.

More specifically, an automated method of characterizing impairments detected by equalization on a channel of a network is provided and includes the steps of estimating equalization stress of an observed channel equalization response of an end device of the network required for equalization and calculating equalization stress of a theoretical channel equalization response of the end device mathematically based on the observed channel equalization response and a theoretical removal of a suspected impairment from the network. The above referenced calculating step is separately repeated for each of a plurality of suspected impairments stored in a database of suspected impairments. A highest ranking suspected dominant impairment is determined from the database of suspected impairments such that removal of the highest ranking suspected dominant impairment from the network would provide a greatest reduction of equalization stress of a channel equalization response of the end device.

According to further embodiments, additional suspected dominant impairments are determined and ranked in a manner as described above. An integrity check can be accomplished by determining a further theoretical channel equalization response of the end device from the observed channel equalization response when the first suspected dominant impairment and any additional suspected dominant impairment or impairments are theoretically removed from the network. This procedure can continue until an acceptable or ideal theoretical channel equalization response is reached. The suspected dominant impairments identified by the above method should properly characterize the distortion actually being experienced and should be able to properly decompose a multi-impairment response into its constituent impairments.

As used herein, the abbreviation "decibels relative to a carrier (dBc)" refers to a measure of the power ratio of a signal to a carrier signal, and is expressed in decibels. Also, "dB" refers to a decibel, "ns" refers to a nanosecond, and "MHz" refers to a megahertz. The term "equalization coefficient" refers to complex tap values used to create an equalizing filter with an inverse channel response, and the term "impairment contribution" refers to causes of impairment in an upstream hybrid fiber coaxial (HFC) plant. Further, the term "cable network plant components" refers to any component that may cause impairment in an upstream channel in the cable network. The components may be components of an HFC network, and may be active or passive components. The upstream channel may be a channel between a modem and a CMTS or another upstream channel in the cable network.

FIG. 1 illustrates a network 100, such as an HFC network, including end devices 102. The end device 102 may be DOCSIS Terminal devices, such as cable modems (CMs), modem terminal adapters, MTAs, and embedded cable modems of DOCSIS set-top gateways (eCMs of DSGs), or any other like devices. The end devices 102 are connected to a headend 104 of the network 100 via nodes 106 and an RF cascade 103 comprised of multiple amplifiers and passive devices including cabling, taps, splitters, and in-line equalizers. A network tap is a hardware device providing access to data within the network 100 and provides the ability to monitor data between two points, for instance components, in the network 100. The headend 104 connects to an IP (Internet Protocol) and/or PSTN (Public Switched Telephone Network) network 108. Data, such as TV programs, audio, video and other data, which may be from the network 108, is sent from the headend 104 to the end devices 102. In addition, the end devices 102 may send data upstream towards the headend 104. Although not shown, each of the nodes 106 may be connected to multiple end devices.

As illustrated in FIG. 1, the headend 104 includes a CMTS 110 and optical transceivers 112 which provide optical communications to and from the CMTS 110 through optical fiber to the nodes 106. Typically, the nodes 106 connect to the headend 104, and the headend 104 contains a plurality of CMTS units 110. Each CMTS 110 contains a plurality of transceivers, which communicate with the plurality of end devices 102. For example, each CMTS 110 may have eight, forty-eight or more receivers, and each receiver may communicate with hundreds or more of end devices 102.

Figure 2:
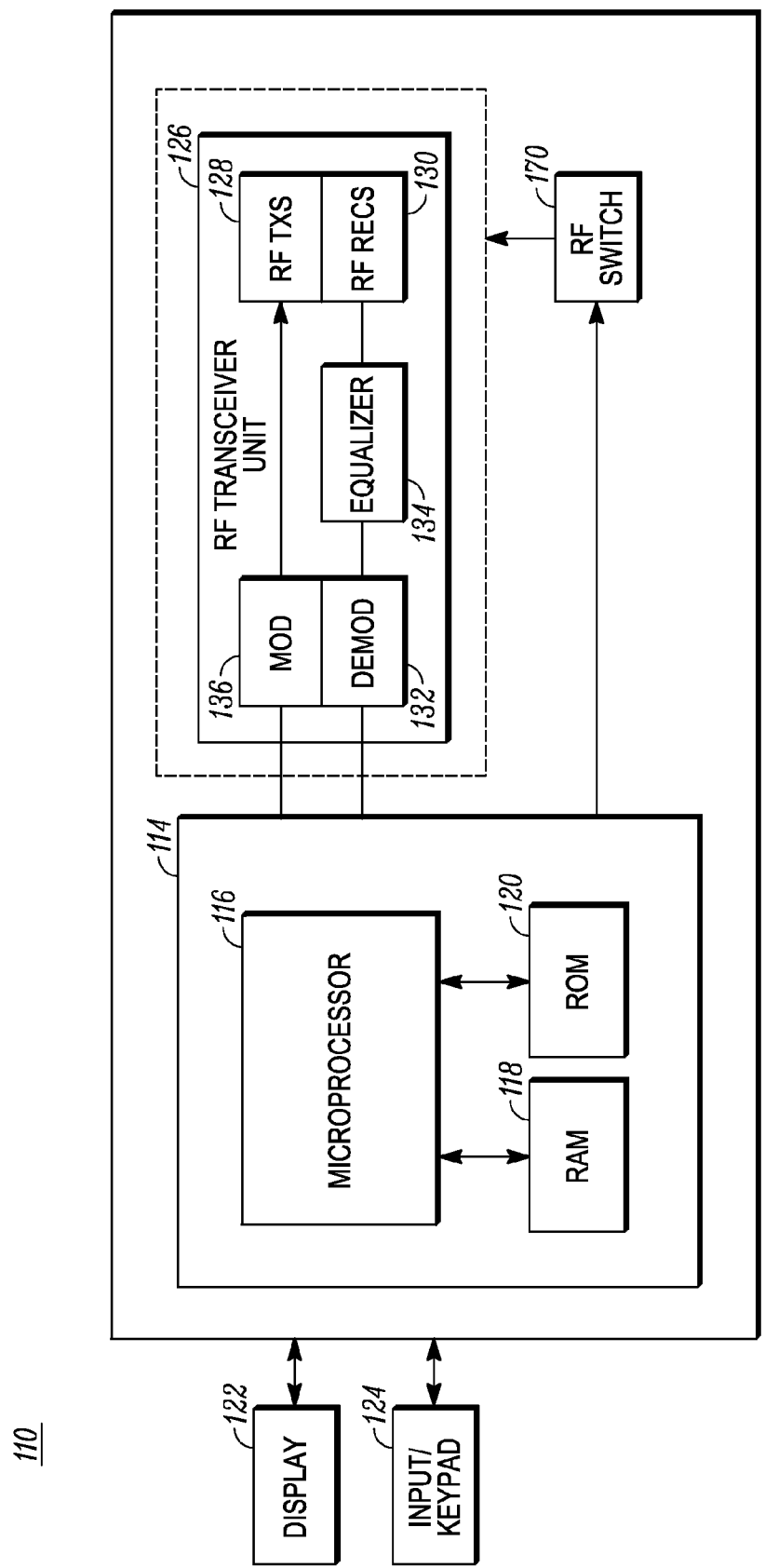
FIG. 2 illustrates CMTS architecture according to an embodiment.

FIG. 2 illustrates architecture of the CMTS 110. As illustrated, the CMTS 110 includes a processing unit 114 having a microprocessor 116 that receives information, such as instructions and data, from a RAM 118 and a ROM 120. The processing unit 114 controls the operation of the CMTS 110 and RF communication signals to be sent by the end devices 102 to the CMTS 110. The processing unit 114 is connected to a display 122, which may display status information such as whether station maintenance (SM) is being performed, or a receiver is in need of load balancing. An input keypad 124 may also be connected to the processing unit 114 to permit an operator to provide instructions and process requests. The CMTS 110 also includes an RF transceiver (transmitter/receiver) unit 126 having transmitters 128 and receivers 130 providing bi-directional communication capability with the end devices 102.

By way of example, the receivers 130 can be BROADCOM 3140 receivers that each includes a demodulator unit 132 and an equalizer 134 to which received RF signals are provided, for instance, for purposes of acquiring equalizer values and burst modulation error ratio (MER) measurements, packet error rate (PER) and bit error rate (BER). The equalizer 134 can be a multiple tap linear equalizer (e.g. a twenty-four tap linear equalizer), which also is known as a feed forward equalizer (FFE). The equalizer 134 can be integrally contained in the RF receiver, or alternatively, may be provided as a separate device. The communication characteristics of each receiver 130 may be stored on ROM 120 or RAM 118, or may be provided from an external source. Note that the equalizer 134 is in the upstream path, for example, from the end devices 102 towards the network 108.

The RF transceiver unit 126 also includes a modulator 136, which provides the modulated signals to RF transmitters 128. The modulator 136 and demodulator 132 are capable of modulation schemes of various levels of complexity. For example, some upstream DOCSIS modulation schemes that may be used in order of level of complexity include, but are not limited to, 16 QAM, 32 QAM, 64 QAM and 128 QAM. The microprocessor 116 may provide instructions to the end devices 102 as to which modulation scheme is to be used during communication.

The CMTS 110 also provides instructions for the end devices 102 using a transmit pre-equalization (PRE-EQ) feature in order to compensate for upstream channel impairments. The CMTS 110 receives an incoming signal from each of the end devices 102 and compares the incoming signal with an expected signal, which is an ideal response. If the incoming signal received by the CMTS 110 differs from the expected signal, the microprocessor 116 or other processing device performing a PRE-EQ function then determines a set of equalization coefficients (alternately referred to as transmit pre-equalization coefficients) for each of the end devices 102 and instructs the end devices 102 to set their transmit equalization coefficients to the transmit pre-equalization coefficients determined by the PRE-EQ function. The end devices 102 apply the pre-equalization coefficients and then continue to transmit. The CMTS 110 thereafter continues to monitor and compare the incoming signal against the expected signal.

Figure 3:
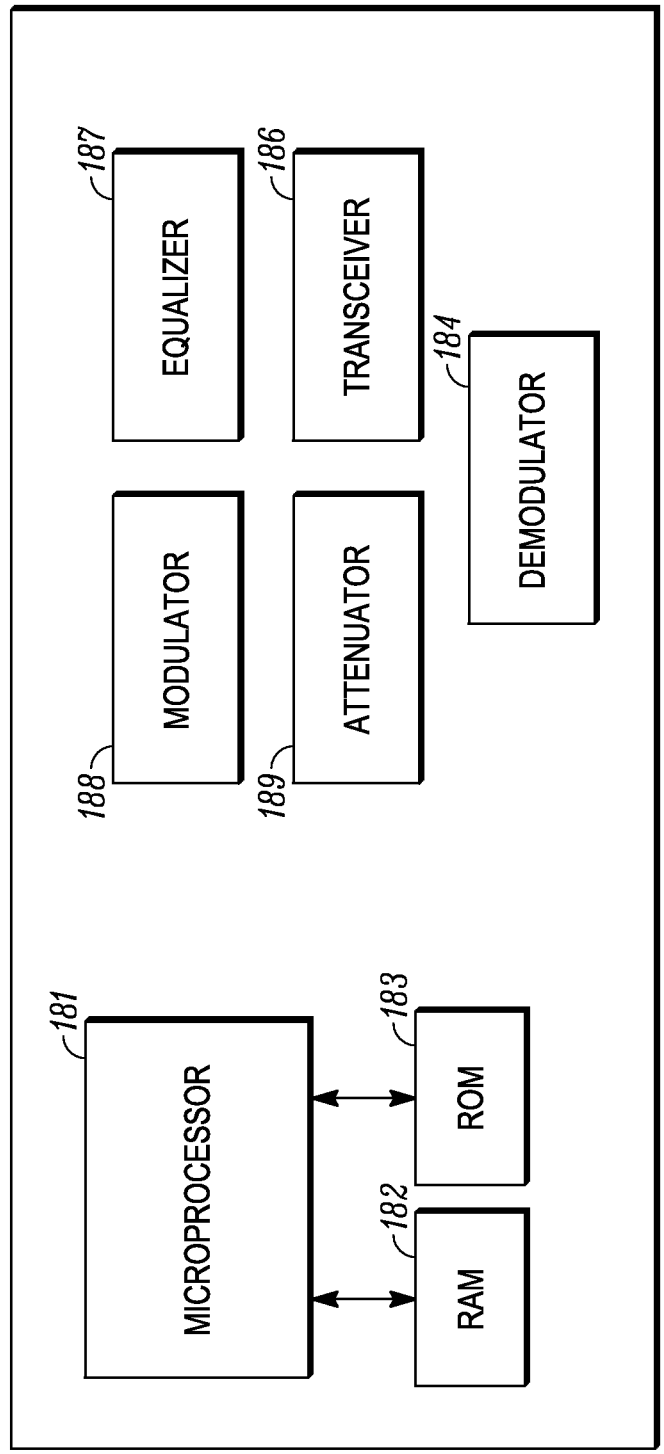
FIG. 3 illustrates cable modem architecture according to an embodiment.

FIG. 3 illustrates an embodiment of one of the end devices 102 (shown as 102a), such as a cable modem. The end device 102a contains a processor 181 which communicates with a RAM 182 and ROM 183 and which controls the general operation of the end device 102, including applying the pre-equalization coefficients and controlling preamble lengths of communications sent by the end device 102a in accordance with instructions from the CMTS 110. The end device 102a also contains a transceiver 186 which provides bidirectional RF communication with the CMTS 110. A demodulator 184 demodulates signals received by the transceiver 186, and an equalizer 187 biases communications transmitted to the CMTS 110. For example, the equalizer 187 is connected in the upstream path between a transmitter in the transceiver 186 and the CMTS 110. The microprocessor 181 configures the equalizer 187 using the coefficients received from the CMTS 110 to compensate for upstream impairments. The end device 102a also contains a modulator 188, which modulates signals to be transmitted upstream to the CMTS 110 according to a modulation scheme, which the end device 102a has been instructed to use by the CMTS 110. In addition, the end device 102a has an attenuator 189 controlled by microprocessor 181 to attenuate signals to be transmitted by the RF transmitter to be within a desired power level. Those of skill in the art will appreciate that the components of end device 102a have been illustrated separately only for discussion purposes and that various components may be combined in practice.

The end device 102a may be a DOCSIS network element, such as a cable modem, able to generate a variety of test signals. Test signals may be implemented using one of the available upstream DOCSIS bandwidths, e.g. 200 kHz, 400 kHz, 800 kHz, 1600 kHz, 3200 kHz or 6400 kHz.

Figure 4:
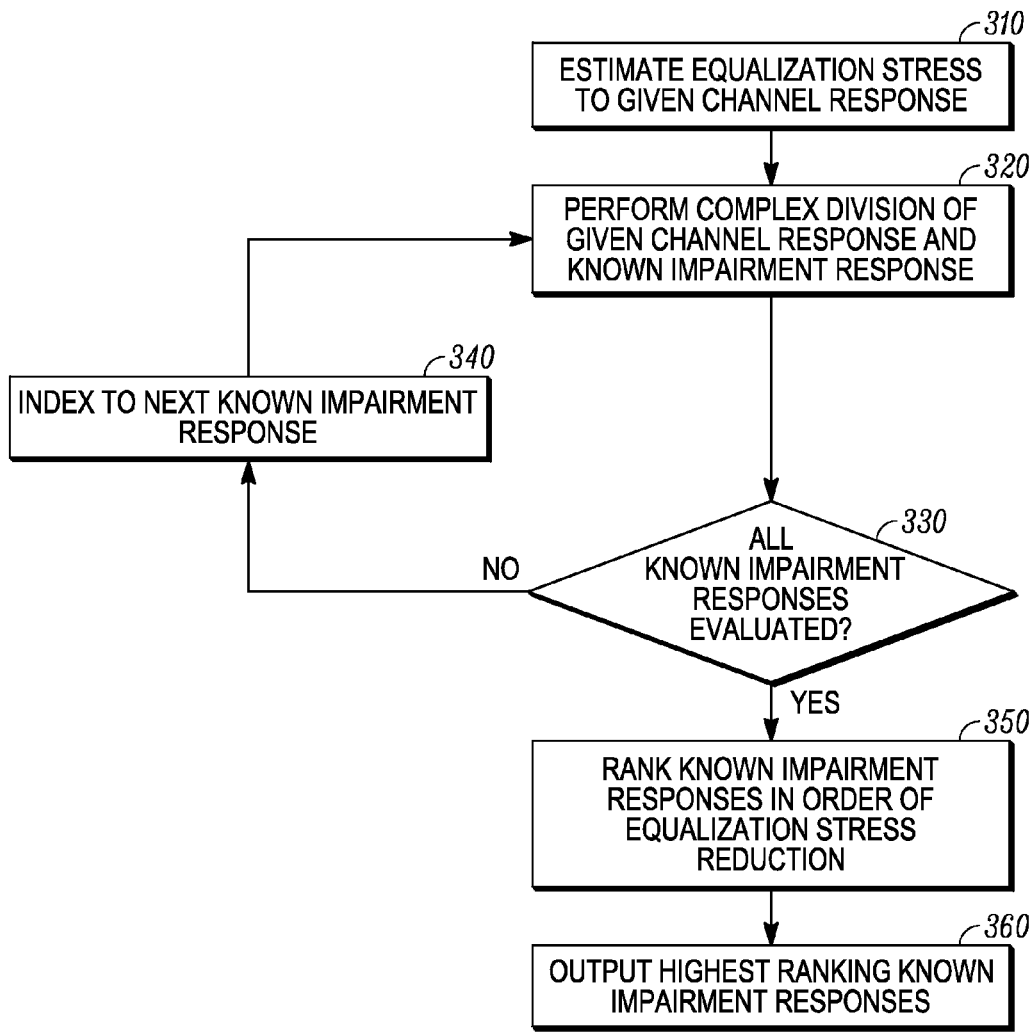
FIG. 4 illustrates a method of characterizing distortion detected by equalization on a channel of a network according to an embodiment.

An embodiment showing the steps of a method 300 for characterizing distortion detected by equalization for purposes of minimizing equalization stress in the system 100 using the end devices 102 is shown by way of flow diagram in FIG. 4. The method 300 provides a comprehensive approach that incorporates time and frequency domains thereby improving reliability of impairment identification and that provides operators with a reliable means of approximating impairment characteristics so that maintenance activities can efficiently identify suspect HFC components for maintenance. Some or all of the operations set forth in the method 300 may be contained as one or more computer programs stored in any desired computer readable medium and executed by a processor on a computer system.

The method 300 illustrated in FIG. 4 requires systematic evaluation of a given, actual or observed channel equalization response of an end device against a population and/or collection of known or suspected distortion impairment equalization responses to aid in the proper identification of a dominant impairment, or combinations thereof, causing the observed channel equalization response. A "channel equalization response" is the response of the equalizer based on equalization coefficient settings used to produce an inverse filter determined for an end device 102, such as a cable modem, during an equalization process. The "known or expected distortion impairment responses" are signatures of channel equalization responses stored in the form of a database or the like for known or suspected impairments on the network. Each impairment response entry in the database may be based on prior measurements with respect to actual field experience, results of methodical laboratory characterization or simulation, or both.

In step 310, equalization stress of an actual or observed channel equalization response is estimated. Equalization stress may be measured by any one of the following metrics: Main Tap Compression (MTC); Non Main Tap to Total Tap Energy Ratio (NMTTER); Pre Main Tap to Total Energy Ratio (PreMTTER); Post Main Tap to Total Energy Ratio (PostMTTER); Pre/Post Energy Symmetry Ratio (PPESR); and Pre/Post Tap Symmetry Ratio (PPTSR).

By way of example, MTC at the cable modem is a good indicator of the available margin for the continued reliance on the equalization compensation process. A MTC ratio greater than about 2 dB may suggest that equalization can no longer be successfully achieved. MTC is the ratio of the energy in all taps relative to the main tap energy. MTC can be calculated as 10 Log(Total Tap Energy/Main Tap Energy).

NMTTER is a metric used to determine the distortion level in the upstream channel and is the ratio of the aggregate energy that exists in all but the main tap to the energy in all of the taps. NMTTER can be calculated as 10 Log((Pre-Main Tap Energy+Post Main Tap Energy)/Total Tap Energy). NMTTER is a metric used to assess equalizer stress because it represents a comprehensive measure of equalization correction relative to the equalizer main tap level.

PreMTTER is a metric used to determine the group delay level in the upstream channel and is the ratio of the pre-main tap energy to the energy in all taps. PreMTTER can be calculated as 10 Log(Pre-Main Tap Energy/Total Tap Energy).

PostMTTER is a metric used to access micro-reflection impairment contribution and is the ratio of the post-main tap energy to the energy in all taps. PostMTTER can be calculated as 10 Log(Post Main Tap Energy/Total Tap Energy).

PPESR is a metric used to determine the group delay level in the upstream channel and is the ratio of pre to post-main tap energy. PPESR can be calculated as 10 Log(Pre-Main Tap Energy/Post-Main Tap Energy). PPTSR is a metric also used to determine the group delay level in the upstream channel and is the ratio of only the two taps adjacent to the main tap.

In step 320, complex algebraic division of the observed channel equalization response and one of the known impairment equalization responses stored in the database discussed above is performed. The purpose of this is to determine a theoretical modified channel equalization response. This response is theoretical in that it is merely produced by result of a mathematical calculation and represents an estimate of the channel equalization response that would be expected should the existence of the known or suspected impairment actually be eliminated from the network. The theoretical modified channel equalization response includes a determination of equalization stress. Thus, assuming the particular known or suspected impairment is removed from the network, the amount of reduction (or increase) of equalization stress provided by its elimination can be estimated. A suspected impairment that, upon removal from the network, provides the greatest amount of reduction of equalization stress is of particular interest.

In step 330, a decision is made as to whether or not step 320 has been performed with the actual or observed channel equalization response and all known or suspected impairment responses stored in the database. If not, the next known response stored in the database is indexed and selected in step 340 and used in step 320. This evaluation systematically and automatically continues until all known or suspected impairment responses have been applied as in step 320.

As a result of individually considered each of the known or suspected impairment equalization responses in the calculations of step 320, each known or suspected impairment equalization response has essentially been subtracted from the observed channel equalization response and the resultant theoretical equalization responses are ranked in order from highest to lowest with respect to equalization stress minimization provided. See step 350. Here, when each known or suspected impairment equalization response is removed from the actual or observed channel equalization response, the known or suspected impairment providing the greatest reduction of equalization stress is ranked as a first suspected dominant impairment. The known or suspected impairment providing the second greatest reduction of equalization stress can be identified and ranked as a second suspected dominant impairment and so forth. In step 360, this information or ranking is output thereby identifying what is believed to be the suspected dominant impairment or impairments.

In most cases, the removal of a combination of single dominant impairments has the greatest impact in reducing equalization stress. Thus, after determining the first suspected dominant impairment, an integrity check can be performed to determine if equalization stress can be further reduced. Here, the theoretical channel equalization response determined when the first suspected dominant impairment is theoretically removed from the network can be analyzed to see whether the result provides an ideal or otherwise acceptable channel equalization response. If not, a further theoretical channel equalization response can be calculated based on the first and second dominant impairments (as ranked by step 350 of the above described method 300) being theoretically removed from the network. If more reduction is required, this procedure can be continued with a third, fourth and any number of additional dominant impairments identified and ranked in the above method. Following the above steps in this manner should ultimately result in a final estimated theoretical channel equalization response that reaches the level of an ideal or otherwise acceptable channel equalization response.

An example is described hereinafter with respect to implementing the method 300 shown in FIG. 4. For purposes of this example, an actual or observed channel equalization response is as shown in FIGS. 5A-5D which represent Impulse Response-Magnitude (Tap vs. dB) in FIG. 5A; Channel Response-Magnitude (Relative Frequency (MHz) vs. dB) in FIG. 5B; Channel Response-Group Delay (Relative Frequency (MHz) vs. ns) in FIG. 5C; and a listing of metrics (for estimating equalization stress) provided in FIG. 5D. The condition shown in FIGS. 5A-5d is relative to a composite micro-reflection scenario. In FIG. 5D, equalization stress as indicated by MTC, for instance, is 1.000 dB and NMTTER is −6.870 dB.

Based on a conventional process, the impairment condition shown in FIGS. 5A-5D would simply be identified as a single micro-reflection impairment with delay equal to 1.5 T and a relative level of −10 dBc. Accordingly, if technicians were dispatched to HFC components on the network associated with the above characteristics, no problem would be found by the technicians because the conventional process has misdiagnosed the impairments contributing to this equalization response.

Figure 6A:
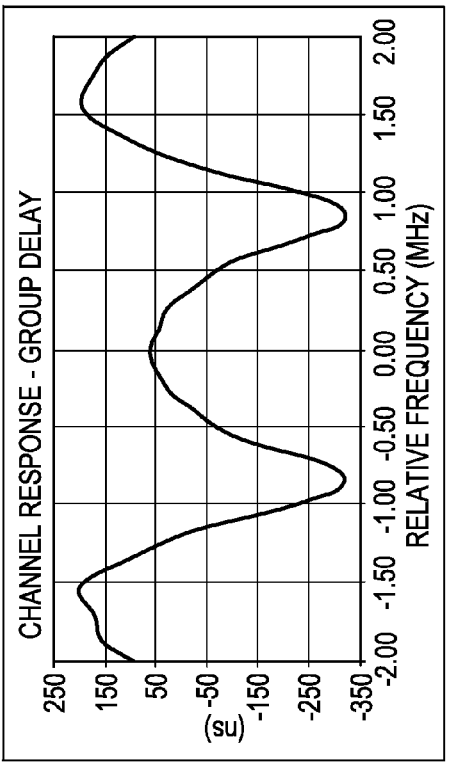
FIGS. 6A-6D illustrate the results when a misdiagnosed impairment is removed from the composite impairment response of FIGS. 5A-5D.
Figure 6B:
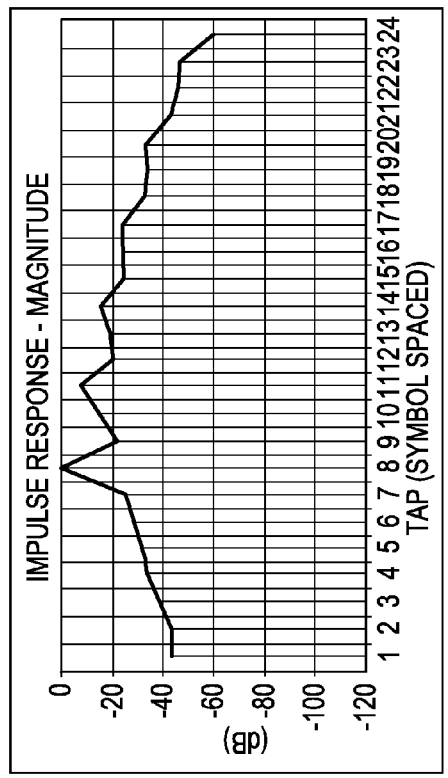
Figure 6C:
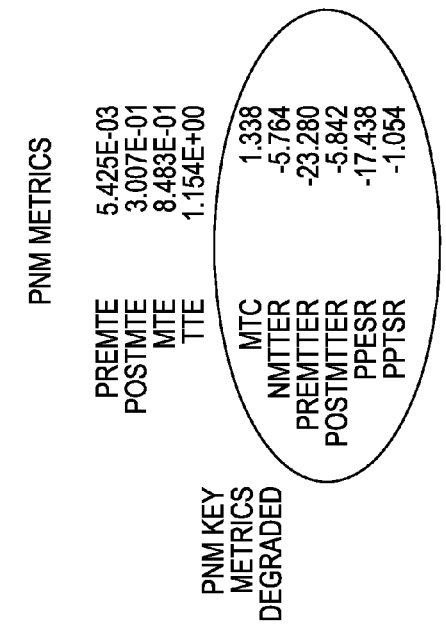
Figure 6D:
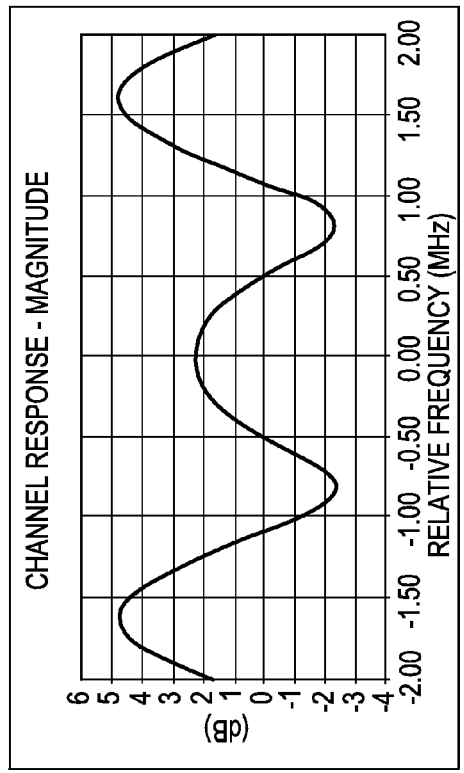

In contrast to conventional processes, method 300 provides a dramatic improvement over such processes by testing impairment responses for accuracy by leveraging equalization responses of known or suspected impairments to approximate whether their removal from the network would yield a favorable equalization response improvement. For example, when this is used as an integrity check for the estimated single micro-reflection having a delay equal to 1.5 T and a relative level of −10 dBc provided by the conventional process, the results are as shown in FIGS. 6A-6D. Here, FIGS. 6A-6D reveal through complex division of the suspected impairment in the frequency domain yields negligible improvement in the equalization time and frequency domain responses. This fact is also reflected in degradation of the equalization stress metrics listed in FIG. 6D; for instance, MTC increases to 1.338 dB from 1.000 dB and NMTTER increases to −5.764 dB from −6.870 dB. As before, FIG. 6A is Impulse Response—Magnitude (Tap vs. dB); FIG. 6B is Channel Response—Magnitude (Relative Frequency (MHz) vs. dB); FIG. 6C is Channel Response—Group Delay (Relative Frequency (MHz) vs. ns); and FIG. 6D is a listing of metrics estimating equalization stress. Thus, when dividing the initial condition by the suspected impairment (−10 dBc, 1.5 T), it is clear that the conventional process results in a misdiagnosis of the impairment and its equalization response.

In comparison, when following the steps of the method 300 outlined in FIG. 4 and discussed above, the first and second ranked dominant impairments output as a result of the method are: Micro-Reflection #1, Amplitude=−10 dBc, Delay=3 T; and Micro-Reflection #2, Amplitude=−10 dBc, Delay=1 T. Furthermore, FIGS. 7A-7D and FIG. 8A-8D illustrate desirable response improvements through integrity checking of suspected equalization responses. Improvement in equalization response is validated in graphical time and frequency domain responses. Additionally, the metrics listed in FIGS. 7D and 8D reveal appreciable reduction of equalization stress; for instance, FIG. 7D indicates a reduction of MTC from 1.000 dB to 0.458 dB and NMTTER from −5.764 dB to −9.998 dB, and FIG. 8D indicates a further reduction of MTC from 0.458 dB to 0.000 dB and NMTTER from −9.998 dB to −66.383 dB (ideal or impairment-free).

Figure 7A:
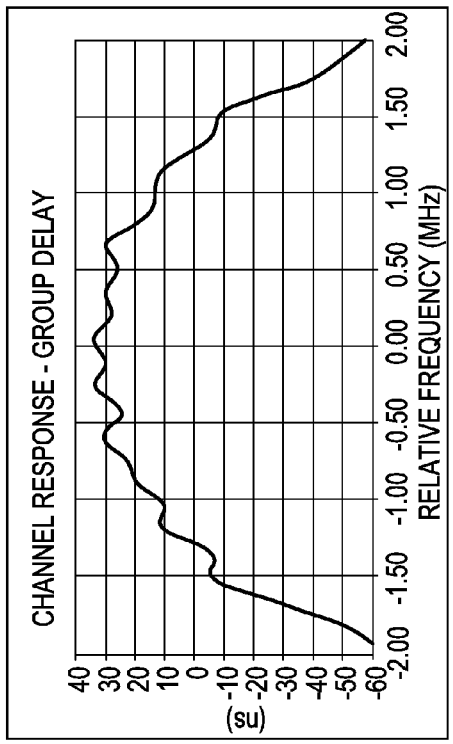
FIGS. 7A-7D illustrate the results when a first dominant micro-reflection properly diagnosed is removed from the composite impairment response of FIGS. 5A-5D according to an embodiment.
Figure 7B:
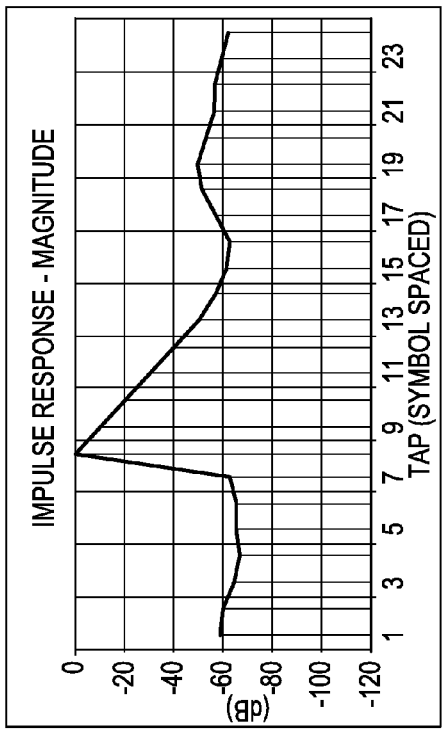
Figure 7C:
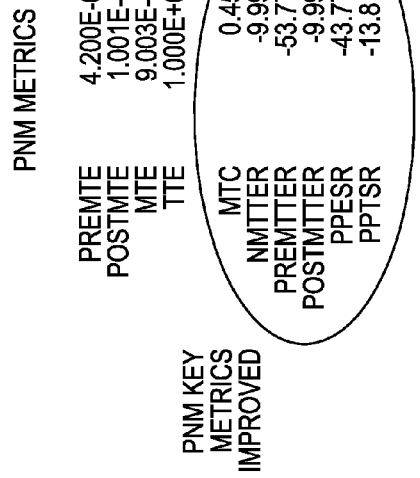
Figure 7D:
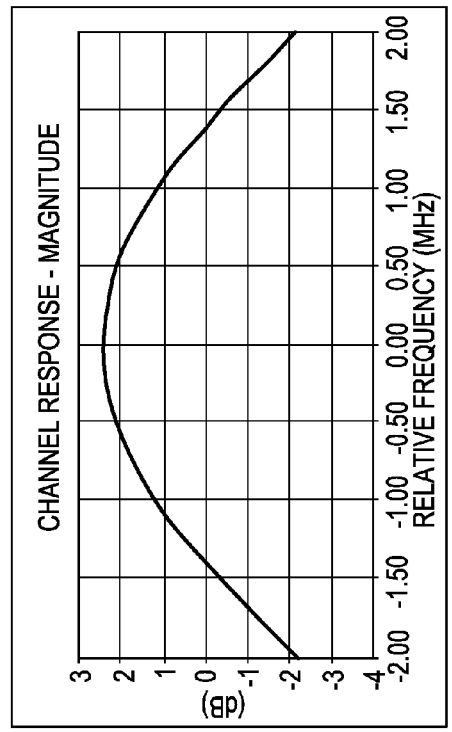

More specifically, FIGS. 7A-7D show the results of dividing the initial impulse response by the suspected Micro-Reflection #1 impairment equalization response (−10 dBc, 3 T). This provides the highest ranked known impairment that, if corrected, would reduce equalization stress by the greatest amount as determined according to method 300. Here, FIG. 7A is Impulse Response—Magnitude (Tap vs. dB); FIG. 7B is Channel Response—Magnitude (Relative Frequency (MHz) vs. dB); FIG. 7C is Channel Response—Group Delay (Relative Frequency (MHz) vs. ns); and FIG. 7D is a listing of metrics. Upon inspection of FIG. 7D, the metrics clearly improved.

FIGS. 8A-8D show the results of dividing the resulting impairment response shown in FIGS. 7A-7D by the suspected Micro-Reflection #2 impairment equalization response (−10 dBc, 1 T). Micro-Reflection #2 provides the next highest ranked known impairment that, if corrected, would reduce equalization stress by a next greatest amount. Here, FIG. 8A is Impulse Response—Magnitude (Tap vs. dB); FIG. 8B is Channel Response—Magnitude (Relative Frequency (MHz) vs. dB); FIG. 8C is Channel Response—Group Delay (Relative Frequency (MHz) vs. ns); and FIG. 8D is a listing of metrics. FIGS. 8A-8D clearly reveal that the process has been completed because the successful removal of Micro-Reflection #1 and #2 from the initial observed channel equalization response shown in FIGS. 5A-5D results in an ideal equalization response (see FIGS. 8A-8C). Upon inspection of the metrics listed in FIG. 8D, the metrics indicate that only negligible impairment remains and that equalization stress has been reduced to very low levels (for instance, MTC=0.000 dB and NMTTER=−66.383 dB).

Thus, the method of FIG. 4 can be used to accurately identify impairment equalization responses and composites thereof which when removed from an observed channel equalization response results in a substantially ideal equalization response. With such information, cable operators should then be well-positioned to identify which impairments require maintenance and which require further monitoring. The composite micro-reflection impairment discussed in the above example is only one of the many possible scenarios of distortion impairments and composites thereof and that the composite micro-reflection impairment has been used here for illustrative purposes only. This process may be generalized for any distortion impairment or combination of impairments detectable by equalization.

The method disclosed herein can be used to provide reliable approximation of impairment contributors that minimize equalization stress and improve network performance. At least some of the improvement results from the use of an integrity check of suspected impairments and HFC components prior to dispatching technicians to the field for maintenance. The provided enhancements eliminate issues associated with misdiagnosing equalization responses particularly when a combination of impairments is being experienced. Accordingly, the method disclosed herein provides an automated process for accurately characterizing distortion using available DOCSIS infrastructure and more reliable identification of impairment characteristics necessary for maintenance activities.

The steps and analysis described for the above referenced method may be controlled by software or like application adapted to run on a CMTS, a remote server, or some other signal processing electronic device connected to the CMTS and/or the network. Such a signal processing electronic device for carrying out the methods can physically be provided on a circuit board or within another electronic device and can include various processors, microprocessors, controllers, chips, and the like. It will be apparent to one of ordinary skill in the art that modules, processors, controllers, units, and the like may be implemented as electronic components, software, hardware or a combination of hardware and software. In addition, a non-transitory computer readable storage medium having computer program instructions stored thereon that, when executed by a processor, causes the processor to perform the above discussed operations can also be provided.

While the principles of the embodiment have been described above in connection with specific networks, devices, apparatus, systems, and methods, it is to be clearly understood that this description is made only by way of example and not as limitation on the scope of the invention as defined in the appended claims.

We claim:

1. An automated method of characterizing impairments detected by equalization on a channel of a network, comprising, in at least one processor:
    estimating a first equalization stress of an observed channel equalization response of an end device of the network required for equalization;
    calculating a second equalization stress of a channel equalization response of the end device mathematically based on the observed channel equalization response and a removal of a suspected impairment from the network;
    repeating said calculating step separately for each of a plurality of suspected impairments stored in a database of suspected impairments; and
    determining a highest ranking suspected dominant impairment from the database of suspected impairments that, if removed from the network, would provide a greatest reduction of an equalization stress of a channel equalization response of the end device;
    wherein equalization stress is measured by at least one metric selected from a group of metrics consisting of Main Tap Compression (MTC), Non Main Tap to Total Tap Energy Ratio (NMTTER), Pre Main Tap Energy Ratio (PreMTTER), Post Main Tap Energy Ratio (PostMTTER), Pre/Post Energy Symmetry Ratio (PPESR), and Pre/Post Tap Symmetry Ratio (PPTSR) wherein, during said determining step, an ordered series of next highest ranking suspected dominant impairments are identified from the database of suspected impairments that, if removed from the network, would provide next greatest reductions of the equalization stress of the channel equalization response of the end device.

2. The automated method according to claim 1, wherein, during said determining step, a next highest ranking suspected dominant impairment is identified from the database of suspected impairments that, if removed from the network, would provide a next greatest reduction of equalization stress of the channel equalization response of the end device.

3. The automated method according to claim 2, further comprising a step of determining a further modified channel equalization response from the observed channel equalization response assuming the highest ranking suspected dominant impairment and the next highest ranking suspected dominant impairment are removed from the network.

4. The automated method according to claim 1, further comprising a step of determining a further modified channel equalization response from the observed channel equalization response assuming the highest ranking suspected dominant impairment, a next highest ranking suspected dominant impairment, and at least one additional next highest ranking suspected dominant impairment are removed from the network.

5. The automated method according to claim 1, wherein said calculating step includes division of the observed channel equalization response by a known channel equalization response of the suspected impairment to produce the channel equalization response from which the equalization stress of the channel equalization response is determined.

6. The automated method according to claim 1, wherein the database of suspected impairments includes a known impairment equalization response for each of the suspected impairments in the database.

7. The automated method according to claim 6, further comprising a step of populating the database of suspected impairments with known impairment equalization responses obtained based on at least one of laboratory simulations and prior actual observations.

8. The automated method according to claim 1, wherein said estimating, re-calculating, repeating, and determining steps are performed electronically with software.

9. An apparatus for characterizing impairments detected by equalization on a channel of a network, comprising:
    one or more processors communicatively coupled to the network, wherein the network has a headend with a cable modem termination system (CMTS);
    the one or more processors configured to estimate a first equalization stress of an observed channel equalization response of a cable modem of the network required for equalization;
    the one or more processors further configured to calculate a second equalization stress of a channel equalization response of the cable modem mathematically based on the observed channel equalization response and a removal of a suspected impairment from the network;
    the one or more processors further configured to repeat said calculating step separately for each of a plurality of suspected impairments stored in a database of suspected impairments; and
    the one or more processors further configured to determine a highest ranking suspected dominant impairment from the database of suspected impairments that, if removed from the network, would provide a greatest reduction of an equalization stress of a channel equalization response of the cable modem;
    wherein a communication protocol used by the cable modem and CMTS for equalization is Data Over Cable System Interface Specification (DOCSIS), and a modulation scheme used by the network is quadrature amplitude modulation (QAM); and
    wherein equalization stress is measured by at least one metric selected from a group of metrics consisting of Main Tap Compression (MTC), Non Main Tap to Total Tap Energy Ratio (NMTTER), Pre Main Tap Energy Ratio (PreMTTER), Post Main Tap Energy Ratio (PostMTTER), Pre/Post Energy Symmetry Ratio (PPESR), and Pre/Post Tap Symmetry Ratio (PPTSR) wherein, during said determining step, an ordered series of next highest ranking suspected dominant impairments are identified from the database of suspected impairments that, if removed from the network, would provide next greatest reductions of the equalization stress of the channel equalization response of the end device.

10. At least one non-transitory computer readable storage medium having computer program instructions stored thereon that, when executed by at least one processor, cause the at least one processor to perform the following operations:

estimating a first equalization stress of an observed channel equalization response of an end device of a network;

calculating a second equalization stress of a channel equalization response of the end device mathematically based on the observed channel equalization response and a removal of a suspected impairment from the network;

repeating said calculating step separately for each of a plurality of suspected impairments stored in a database of suspected impairments; and determining a highest ranking suspected dominant impairment from the database of suspected impairments that, if removed from the network, would provide a greatest reduction of an equalization stress of a channel equalization response of the end device;

wherein equalization stress is measured by at least one metric selected from a group of metrics consisting of Main Tap Compression (MTC), Non Main Tap to Total Tap Energy Ratio (NMTTER), Pre Main Tap Energy Ratio (PreMTTER), Post Main Tap Energy Ratio (PostMTTER), Pre/Post Energy Symmetry Ratio (PPESR), and Pre/Post Tap Symmetry Ratio (PPTSR) wherein, during said determining step, an ordered series of next highest ranking suspected dominant impairments are identified from the database of suspected impairments that, if removed from the network, would provide next greatest reductions of the equalization stress of the channel equalization response of the end device.

11. The at least one non-transitory computer readable storage medium according to claim 10, wherein, during said determining operation, a next highest ranking suspected dominant impairment is identified from the database of suspected impairments that, if removed from the network, would provide a next greatest reduction of equalization stress of the channel equalization response of the end device.

12. The at least one non-transitory computer readable storage medium according to claim 11, wherein the computer program instructions, when executed by the at least one processor, cause the at least one processor to determine a further modified channel equalization response from the observed channel equalization response assuming the highest ranking suspected dominant impairment and the next highest ranking suspected dominant impairment are removed from the network.

13. The at least one non-transitory computer readable storage medium according to claim 10, wherein the computer program instructions, when executed by the at least one processor, cause the at least one processor to determine a further modified channel equalization response from the observed channel equalization response assuming the highest ranking suspected dominant impairment, a next highest ranking suspected dominant impairment, and at least one additional next highest ranking suspected dominant impairment are removed from the network.

14. The at least one non-transitory computer readable storage medium according to claim 10, wherein the calculating operation includes division of the observed channel equalization response by a known channel equalization response of the suspected impairment to produce the channel equalization response from which the equalization stress of the channel equalization response is determined.

15. The at least one non-transitory computer readable storage medium according to claim 10, wherein the database of suspected impairments includes a known impairment response for each of the suspected impairments in the database.

16. The at least one non-transitory computer readable storage medium according to claim 15, wherein the computer program instructions, when executed by the at least one processor, cause the at least one processor to populate the database of suspected impairments with known impairment responses.

* * * * *